United States Patent [19]

Haubennestel et al.

[11] Patent Number: 5,735,944
[45] Date of Patent: Apr. 7, 1998

[54] FREE FLOWING ADDITIVE PREPARATIONS, A PROCESS FOR PRODUCING THEM, AND THEIR USE IN POWDER COATINGS

[75] Inventors: Karlheinz Haubennestel, Wesel; Alfred Bubat, Wesel-Bislich, both of Germany

[73] Assignee: BYK-Chemie GmbH, Wesel, Germany

[21] Appl. No.: 650,457

[22] Filed: May 20, 1996

[30] Foreign Application Priority Data

Jun. 21, 1995 [DE] Germany .................. 195 22 475.2

[51] Int. Cl.$^6$ .................................................. C09D 7/12
[52] U.S. Cl. ......................... 106/272; 106/481; 106/502
[58] Field of Search ........................... 106/502, 272, 106/481

[56] References Cited

U.S. PATENT DOCUMENTS

| | | | |
|---|---|---|---|
| 4,092,285 | 5/1978 | Leo et al. | 260/28.5 R |
| 4,310,483 | 1/1982 | Dorfel et al. | 106/502 |
| 4,484,952 | 11/1984 | Bes et al. | 106/272 |
| 5,176,751 | 1/1993 | Findley | 106/272 |
| 5,542,974 | 8/1996 | Buding | 106/502 |

FOREIGN PATENT DOCUMENTS

| | | |
|---|---|---|
| 42 00 61 | 12/1971 | Australia. |
| 0 088 370 | 9/1983 | European Pat. Off.. |
| 0 423 952 | 4/1991 | European Pat. Off.. |
| 0 537 006 | 4/1993 | European Pat. Off.. |
| 2 202 907 | 7/1973 | Germany. |
| 03 043 466 | 2/1991 | Japan. |
| 1538718 | 1/1979 | United Kingdom ............... 106/502 |

*Primary Examiner*—David Brunsman
*Attorney, Agent, or Firm*—Merchant, Gould, Smith, Edell, Welter & Schmidt

[57] ABSTRACT

This invention relates to free flowing additive preparations, particularly for powder coatings, which can be obtained by incorporating one or more liquid or viscous-adhesive additives in a wax melt consisting of one or more waxes, cooling the mixture obtained to a temperature below its melting point, and comminuting the solidified mixture or converting the mixture which is still liquid into a finely divided form and cooling the particles obtained. The invention also relates to a process for producing such preparations and to their use.

14 Claims, No Drawings

FREE FLOWING ADDITIVE PREPARATIONS, A PROCESS FOR PRODUCING THEM, AND THEIR USE IN POWDER COATINGS

This invention relates to free flowing additive preparations in solid form, which can be used as auxiliary materials, particularly in powder coating production.

In the production of powder coatings, substances which are predominantly solids, such as coarse-ground synthetic resins, pigments, extenders, additive concentrates (master batches) and hardeners, are mixed to form a powder coating formulation and are melted and homogenised in this form via an extrusion operation. After the extrusion operation, the molten powder coating formulation is cooled and comminuted.

The advantage of powder coatings is based on the fact they contain no solvent. It is thus necessary that all substances used for them are as free from solvent as possible and are employed in a pulverulent or in a solid, free flowing form.

It is known that powder coatings may contain a series of additives, which are employed, for example, to reduce the high melt viscosity, to reduce surface tension, to improve deaeration, to improve flow, to enhance gloss, and to improve the dispersion behaviour of pigments.

However, most of these additives which are used in the production of powder coatings are only obtainable in liquid or highly viscous form and have to be converted into a form suitable for powder coating technology.

Various processes are used in order to convert these materials into a form suitable for powder coating production.

The processes which are customary nowadays are firstly the production of what are termed additive concentrates (master batch). In this procedure the additives, which are liquids for the most part, are melted into the corresponding powder coating resins and are then ground to form powders or are or comminuted to form coarse particles after solidifying the melt. These powders, which contain additives, are then added as auxiliary materials to the powder coating formulation before extrusion.

A disadvantage of this process is that only about 10% of the liquid or soft, resin-like components can be added to the powder coating resin without causing these additive concentrates to become conglutinated. Another disadvantage is that these additive concentrates cannot be used universally, since they are very specific for the resins used for production, and problems are often to be expected when introducing extraneous resins into powder coating formulations. This is the situation, for example, when additive concentrates in polyester resins are prepared and these are then used in a powder coating based on acrylic resin.

Secondly, processes are used in which the liquid components are deposited on to capillary-active hydrated silicas which are capable of absorbing about 60% of a liquid component without losing their pulverulent form (German Patent Specification 2202907). The pulverulent products containing hydrated silica which are produced in this manner are also called "dry liquids". When subjected to the effects of shear stresses and temperature, such as those which occur in an extruder, for example, these products release at least the major part of the active ingredient again. A certain proportion remains adsorbed on the capillary-active hydrated silica, however, and is thus removed from the process as an active ingredient.

Experience has shown that about 10–20% of the active ingredient used in this process is not effectively available as an auxiliary material. A further disadvantage of this "dry liquid" is due to the nature of the relatively coarsely dispersed hydrated silica. As may be anticipated, this hydrated silica acts as a matting agent or at least reduces the gloss in high-gloss powder coating systems. It also results in a haze in transparent powder coating systems.

The object of the present invention is to avoid the prior art disadvantages described above and to provide free flowing additive preparations which can be used without problems in the production of powder coating. A further object of the invention is to provide a process for producing these free flowing additive preparations.

Surprisingly, it has been found that this object can be achieved by incorporating the liquid or highly viscous additives in wax.

The present invention therefore relates to free flowing additive preparations, particularly for powder coatings, which can be obtained by incorporating one or more liquid or viscous-adhesive additives in a wax melt consisting of one or more waxes, cooling the mixture obtained to a temperature below its melting point, and comminuting the solidified mixture or converting the mixture which is still liquid into a finely divided form and cooling the particles obtained. Small amounts of modifying waxes or emulsifiers may be used in addition to the main wax component.

The mixtures of wax and additives are converted into powder by known processes. Spraying processes are particularly suitable in which the melts are converted into fine or very fine particles, mostly of spherical shape, whilst they are finely divided and in free fall, assisted also by blowing with countercurrent cold air (spray-chilling).

Spraying can be effected by known processes, either by specially shaped spray nozzles or also via rotating, heated discs in appropriate spray towers, for example.

However, processes which result in coarse particles are also suitable for producing the additive preparations according to the invention. Processes should be cited here, for example, in which the melt of wax and additive is discharged on to a cooled roll or cooling belt, and where the mixture is obtained as a pellet in the shape of a drop or as a chip after the melt has solidified.

These quite simple processes are often sufficient in order to obtain a solid additive which can easily be added in metered amounts.

The additive preparations preferably have a maximum dimension of 10 µm to 3 cm, wherein compact or approximately spherical particles generally have diameters from 10 µm to 5 mm and chips or flakes may have dimensions up to 3 cm.

The advantages of this process according to the invention are due to the excellent distribution of the additive components during the extrusion of the powder coating mixture, since by appropriately selecting waxes having a melting temperature matched to the melting point of the resin, the additive is released completely and is then present homogeneously distributed in the powder coating formulation.

Additives are normally used in very small amounts, so that the homogenisation of such small amounts in a heterogeneous mixture often presents problems. This situation is also considerably improved by the present process, since the release of the additive occurs very early in the extrusion phase due to the melting of the wax.

A further advantage of this process is that waxes offer additional advantages as regards the slip property and abrasion resistance of the finished, applied powder coatings, since waxes are very often also used on their own as additives.

It is advisable to select a wax which has a melting point at least 10°–20° C. below the processing temperature of the resin mixture in the extruder, in order to obtain release of the additives as early as possible. Optimum distribution during the extrusion operation, which is often only very brief, is thereby ensured.

Secondly, the wax should not have a melting temperature which is too low, in order to enable the additive concentrates to be stored even at high storage temperatures, e.g. in hot countries.

Waxes which have a melting point of 50° C. to 120° C., particularly between 80° C. and 110° C., have proved to be particularly advantageous. Mixtures of different waxes with different melting points are also possible, however.

When using wax mixtures, however, it may also be advantageous to add proportions of waxes which have a higher melting point, e.g. up to 160° C., in order to obtain, together with the low-melting wax, properties which are quite special, such as matting of the powder coating surface for example.

Examples of suitable additives include light stabilisers, additives for improving the charging capacity, anticorrosive agents, catalysts, inhibitors, effect media, structuring agents, bonding agents, matting agents, water-repellent agents, agents which impart hydrophilicity, additives which regulate the surface tension, dispersing agents, wetting agents, flow enhancers, anti-foaming agents, degassing agents, anti-crater agents, slip additives, or, taking their chemical composition into consideration, polyacrylic acid esters, polymethacrylic acid esters, or copolymers of acrylic (methacrylic) acid derivatives, polyvinyl ethers, dialkylpolysiloxanes, alkylarylpolysiloxanes or silicone copolymers (polyether or polyester-modified). Suitable wetting and dispersing agents are described, for example, in EP-A-154 678, EP-A-270 126, EP-A-318 999, DE-A-3 930 687, DE-A-1 157 326 and DE-A-1 157 327.

It is possible to mix a plurality of these additives, to melt them into the waxes and to convert them into a solid form by the process described.

It is advisable to measure out the content of additive in the wax so that it is as high as possible, so as to manage with amounts of the additive preparation according to the invention which are as small as possible.

The aim should preferably be to achieve concentrations of active additive in the wax mixture of 1 to 60% by weight, most preferably 35 to 55% by weight.

If the powders obtained when employing quite high concentrations of active additive agglutinate readily and are no longer easily free flowing, it is sufficient to add small amounts of a finely divided, hydrophobic hydrated silica, which is known as an anti-caking agent or as a flow enhancer for example, to the powder during or after the spraying operation.

Amounts of about 0.1 to 3% of this hydrated silica, which are not found to be troublesome in the final application, are generally sufficient here.

The expression "wax" is not a precisely defined term. R ömpps Chemie Lexikon [*Römpp's Dictionary of Chemistry*], 8th Edition, page 4563, defines wax as a collective technological term for a series of substances which occur naturally or are obtained synthetically, just like the collective term "resins". However, a common property of all waxes is that, at temperatures which are generally between 40° and 100° C. but which are sometimes at higher than this, they change state into that of a low-viscosity molten liquid. A characteristic feature of waxes is that they form drops on melting and do not form filaments as is the case for other polymers. With these waxes, their paraffinic character mostly predominates.

Natural waxes and synthetic waxes are examples of suitable waxes. Suitable natural waxes comprise mineral waxes, vegetable waxes, animal waxes or mixtures thereof. The following should be cited by way of example: crude montan wax, fully refined wax, microcrystalline wax (Mekon® white), vaseline, carnauba wax, candelilla wax, beeswax and shellac wax. Examples of suitable synthetic waxes include Fischer-Tropsch synthesis paraffin, oxidized Fischer-Tropsch paraffin, polyethylene wax, polypropylene wax and oxidized derivatives thereof, polycaprolactone wax, silicone waxes, wax alcohols, polyethylene-vinyl acetate copolymers, polyethylene-acrylic acid copolymers, polyglycol waxes and V-Wachs® (polyvinyl ether).

The invention is described in more detail below with reference to examples.

1. Production Process

General description of the wax/additive mixtures

The wax-like components are placed in a heatable mixer vessel and melted. The temperature of the wax melt should be about 10°–30° C. above the melting point. After this temperature is reached, the liquid components are added and homogenised with stirring. In two-phase systems the mixture is optionally intensively dispersed by means of a disperser unit, possibly with the addition of emulsifying agents, before cooling. The wax/additive mixture is fed to the corresponding cooling unit, such as a spray tower or cooling belt for example, via heated pipelines.

2. Formulations

| Example No. | Carrier substance | | Additive | |
|---|---|---|---|---|
| Example 1 | Fischer-Tropsch wax melting point 100° C. | 50% by weight | polybutyl acrylate molecular weight 30,000 | 50% by weight |
| Example 2 | polyethylene wax melting point 88° C. | 60% by weight | ethyl acrylate/2-ethylhexacrylate copolymer molecular weight 25,000 | 40% by weight |
| Example 3 | polyethylene wax melting point 95° C. ethylene/vinyl acetate copolymer melting point 82° C. | 55% by weight 5% by weight | polyvinylethyl ether molecular weight 15,000 | 40% by weight |
| Example 4 | Fischer-Tropsch wax melting point 100° C. | 45% by weight | polyether-modified methylalkylpolysiloxane melting point 23,000 | 55% by weight |
| Example 5 | polyethylene wax melting point 106° C. | 60% by weight | polybutyl acrylate molecular weight 15,000 polybutadiene molecular weight 3000 | 30% by weight 10% by weight |
| Example | polyethylene wax (oxidised) | 55% by weight | polybutyl acrylate | 25% by weight |

-continued

2. Formulations

| Example No. | Carrier substance | | Additive | |
|---|---|---|---|---|
| 6 | melting point 105° C. acid number 15 ethylene/vinyl acetate copolymer melting point 88° C. | 5% by weight | molecular weight 15,000 polybutadiene molecular weight 3000 benzoin | 5% by weight 10% by weight |
| Example 7 | polyethylene wax melting point 106° C. polyethylene wax melting point 100° C. | 45% by weight 10% by weight | polybutyl acrylate molecular weight 15,000 benzoin fatty alcohol ethoxylate | 25% by weight 15% by weight 5% by weight |
| Example 8 | ethylene/vinyl acetate copolymer melting point 88° C. polyethylene wax melting point 88° C. | 35% by weight 57% by weight | aralkyl-modified methylalkylsiloxane | 8% by weight |
| Example 9 | ethylene/vinyl acetate copolymer melting point 90° C. polyethylene wax melting point 88° C. | 35% by weight 25% by weight | maleate-modified unsaturated fatty acid | 40% by weight |
| Comparative Example | microdispersed amorphous silica | 40% by weight | polybutyl acrylate molecular weight 30,000 | 60% by weight |

The reduction of the resistance to sliding, the flow behaviour, the anti-crater effect and the number of pinholes on the test panels were assessed as the test criteria.

Visual assessment was used for testing the flow behaviour, particular attention being paid to the so-called "orange peel structure". A pronounced "orange peel structure" was assessed as negative; a smooth, homogeneous surface was assessed as positive. The anti-crater effect was determined visually and assessed as positive when a coating free from craters was present. Pinholes, caused by unsatisfactory degassing/defoaming during the stoving process, were also determined visually and assessed as positive when a coating free from pinholes was present.

An accurate method of measurement was employed for measuring the resistance to sliding. This supersedes the "fingernail test" or the measurement of the angle of sliding of cylindrical bodies on the coating, and is described below.

An electric film-applicator with a constant rate of advance was used. A compressive-tensile force transducer was fixed to the holder for the film-applicator guide. The resistance opposing the movement of the sliding body was plotted on a chart recorder by means of this transducer, via a measuring amplifier. The sliding body was moved over the surface to be measured in the tension or compression direction. Weights were used as the sliding bodies, the sliding surface of which consisted of three steel balls fixedly mounted on the underside of the weight.

The sliding value gave the percentage reduction of the resistance to sliding as a percentage, measured by comparison with a sample which was not treated with additives.

Assessment

Flow

1=very good flow
2=good flow
3=poor flow

Anti-crater effect
1=no craters
2=few craters
3=many craters

Number of pinholes

1=no pinholes
2=few pinholes
3=many pinholes

3. General Description of the Application Technology

The components of the powder coatings were mixed in a tumble-mixer with the addition of x % of additive; the mixture was subsequently extruded, granulated, comminuted and sieved. The powder coatings obtained were applied electrostatically to a metal surface and stoved for 12 minutes at 180° C.

4. Lacquer Formulations

| | | |
|---|---|---|
| a) | Polyester lacquer | |
| | polyester resin (acid number about 37) (containing carboxyl groups) | 64.2% by weight |
| | triglycidyl isocyanurate | 4.8% by weight |
| | titanium dioxide | 31.0% by weight |
| b) | Polyester/epoxy hybrid lacquer | |
| | polyester resin (acid number about 73) (containing carboxyl groups) | 29.07% by weight |
| | epoxy resin (epoxy equivalent about 775) | 28.77% by weight |
| | titanium dioxide | 31.00% by weight |
| | accelerator | 1.16% by weight |
| c) | epoxy lacquer | |
| | epoxy resin (epoxy value about 0.12) | 56.95% by weight |
| | hardener (dicyandiamide) | 2.55% by weight |
| | titanium dioxide | 40.00% by weight |

Results

TABLE 1

Application technology results: polyester lacquer

| Example | Dosage [%] | Flow [1-3] | Anti-crater effect [1-3] | Number of pinholes [1-3] | Sliding value [%] |
|---|---|---|---|---|---|
| Example 1 | 0.8 | 1 | 1 | 2 | 66 |
| Example 2 | 0.8 | 1 | 1 | 2 | 69 |
| Example 3 | 0.8 | 1-2 | 1-2 | 2 | 63 |
| Example 4 | 0.8 | 1 | 1 | 1-2 | 79 |

TABLE 1-continued

Application technology results: polyester lacquer

| Example | Dosage [%] | Flow [1-3] | Anti-crater effect [1-3] | Number of pinholes [1-3] | Sliding value [%] |
|---|---|---|---|---|---|
| Example 5 | 0.8 | 1 | 1 | 1 | 72 |
| Example 6 | 0.8 | 1 | 1 | 1 | 62 |
| Example 7 | 0.8 | 1 | 1 | 1 | 75 |
| Example 8 | 0.8 | 1-2 | 1-2 | 2 | 69 |
| Comparative Example | 0.8 | 3 | 3 | 3 | 3 |
| Comparative Example | 1.1 | 2 | 2 | 2-3 | 6 |
| Comparative Example | 1.4 | 1-2 | 1 | 2 | 7 |

TABLE 2

Application technology results: polyester/epoxy hybrid lacquer

| Example | Dosage [%] | Flow [1-3] | Anti-crater effect [1-3] | Number of pinholes [1-3] | Sliding value [%] |
|---|---|---|---|---|---|
| Example 1 | 0.8 | 1 | 1 | 2 | 68 |
| Example 2 | 0.8 | 1 | 1 | 1-2 | 72 |
| Example 3 | 0.8 | 1-2 | 1-2 | 2 | 65 |
| Example 4 | 0.8 | 1 | 1 | 1-2 | 81 |
| Example 5 | 0.8 | 1 | 1 | 1 | 69 |
| Example 6 | 0.8 | 1 | 1 | 1 | 65 |
| Example 7 | 0.8 | 1 | 1 | 1 | 70 |
| Example 8 | 0.8 | 1-2 | 1 | 2 | 76 |
| Comparative Example | 0.8 | 3 | 3 | 3 | 0 |
| Comparative Example | 1.1 | 2 | 2 | 2-3 | 5 |
| Comparative Example | 1.4 | 1-2 | 1 | 2 | 7 |

TABLE 3

Application technology results: epoxy lacquer

| Example | Dosage [%] | Flow [1-3] | Anti-crater effect [1-3] | Number of pinholes [1-3] | Sliding value [%] |
|---|---|---|---|---|---|
| Example 1 | 0.8 | 1 | 1-2 | 2 | 71 |
| Example 2 | 0.8 | 1 | 1 | 2 | 70 |
| Example 3 | 0.8 | 1-2 | 1-2 | 2 | 62 |
| Example 4 | 0.8 | 1 | 1 | 1-2 | 83 |
| Example 5 | 0.8 | 1 | 1 | 1 | 73 |
| Example 6 | 0.8 | 1 | 1 | 1 | 64 |
| Example 7 | 0.8 | 1-2 | 1 | 1 | 69 |
| Example 8 | 0.8 | 1-2 | 1 | 2 | 72 |
| Comparative Example | 0.8 | 3 | 3 | 3 | 5 |
| Comparative Example | 1.1 | 2 | 1-2 | 2-3 | 5 |
| Comparative Example | 1.4 | 1-2 | 1 | 2 | 8 |

Example 9, in combination with Example 6, was processed to form a powder coating in order to examine the wetting and dispersing properties in the polyester lacquer formulation. The wetting and dispersion effect of the product was examined via the hiding power of the lacquer at different coating thicknesses. The lower is the coating thickness at which differences in colour can no longer be measured on a contrast background, the better is the wetting and dispersing property of the additive used.

For this purpose, the powder coating was applied at different coating thicknesses to a black-and-white contrast background and stoved for 12 minutes at 180° C. That thickness was subsequently determined at which differences in hue could no longer be measured between the white and the black background.

| Example No. | Dosage [%] | Necessary coating thickness for optimum hiding power |
|---|---|---|
| Example 6 | 0.8 | 70 µm |
| Example 6 | 0.8 | 55 µm |
| Example 9 | 1.5 | |

The above examples and comparative examples show that advantageous results are obtained by means of the additive preparations according to the invention. In this respect, it is also an advantage that the amount of additives used can be reduced by means of the invention compared with conventional additives.

What is claimed is:

1. A free flowing additive preparation suitable for use with a powder coating comprising particles of a substantially homogeneous solid solution or dispersion of one or more waxes having a melting temperature range at least about 10° C. to 20° C. lower than the processing temperature of the powder coating, and one or more liquid or viscous sticky additives.

2. An additive preparation according to claim 1, wherein the amount of additive present is about 1 to 60% by weight and the amount of wax present is about 99 to 40% by weight and the sum of the amounts equals 100% by weight.

3. An additive preparation according to claim 2, wherein the additive amount is 35 to 55% by weight and the wax amount is 65 to 45% by weight.

4. An additive preparation according to claim 1 wherein the wax or waxes have a melting point of 50° to 120° C.

5. An additive preparation according to claim 1, wherein the additives are light stabilizers, additives for improving the charging capacity, anticorrosive agents, catalysts, inhibitors, effect media, structuring agents, bonding agents, matting agents, water-repellent agents, agents which impart hydrophilicity, additives which regulate the surface tension, dispersing agents, wetting agents, flow enhancers, anti-foaming agents, degassing agents, anti-crater agents, slip additives, polyacrylic acid esters, polymethacrylic acid esters, copolymers of (meth)acrylic acid derivatives, polyvinyl ethers, dialkylpolysiloxanes, alkylarylpolysiloxanes or silicone polymers.

6. An additive preparation according to claim 1, wherein the particles have a maximum dimension of 10 µm to 3 cm.

7. An additive preparation according to claim 1, wherein 0.1 to 5% by weight of hydrated silica is included in the particles, the weight % being with respect to the total weight of additives, wax and hydrated silica.

8. A powder coating with additives comprising a dry particulate combination of a powder coating comprising at least one lacquer resin and a pigment, and a free flowing additive preparation according to claim 1.

9. A free flowing additive preparation according to claim 1 prepared by a process comprising:
melting one or more waxes to form a fluid wax melt at a temperature of about 10° C. to about 30° C. above the wax melting temperature;
mixing with the wax melt one or more liquid or sticky, viscous additives for a powder coating to form a hot homogeneous liquid solution or dispersion; and, forming from the hot homogeneous liquid solution a dispersion of solid particles of free flowing additive preparation.

10. A process for producing a free flowing additive preparation, suitable for use as an auxiliary material with a powder coating comprising:

melting one or more waxes to form a fluid wax melt at a temperature of about 10° C. to about 30° C. above the wax melting point;

mixing with the wax melt one or more liquid or sticky, viscous additives for a powder coating to form a hot homogeneous liquid solution or dispersion; and, forming from the hot homogeneous liquid solution or dispersion solid particles of free flowing additive preparation.

11. A process according to claim 10, wherein the solid particles are formed by spray cooling.

12. A process according to claim 10, wherein the solid particles are formed by cooling the hot liquid solution or dispersion by means of a cooling belt or a cooled roll to form a solid and the solid is comminuted to form the solid particles.

13. A process according to claim 10 wherein the solid particles are formed by converting the hot homogeneous liquid solution or dispersion into a finely divided form and cooling the finely divided form to a temperature below the wax melting temperature.

14. A process according to claim 10 wherein the solid particles are formed by cooling the hot homogeneous liquid solution or dispersion to a temperature below the wax melting temperature to form a solid mass, and comminuting the solid mass.

* * * * *